Feb. 23, 1960  G. A. HOPKINS, JR  2,925,999
PALLET JACK
Filed March 13, 1956  2 Sheets-Sheet 1
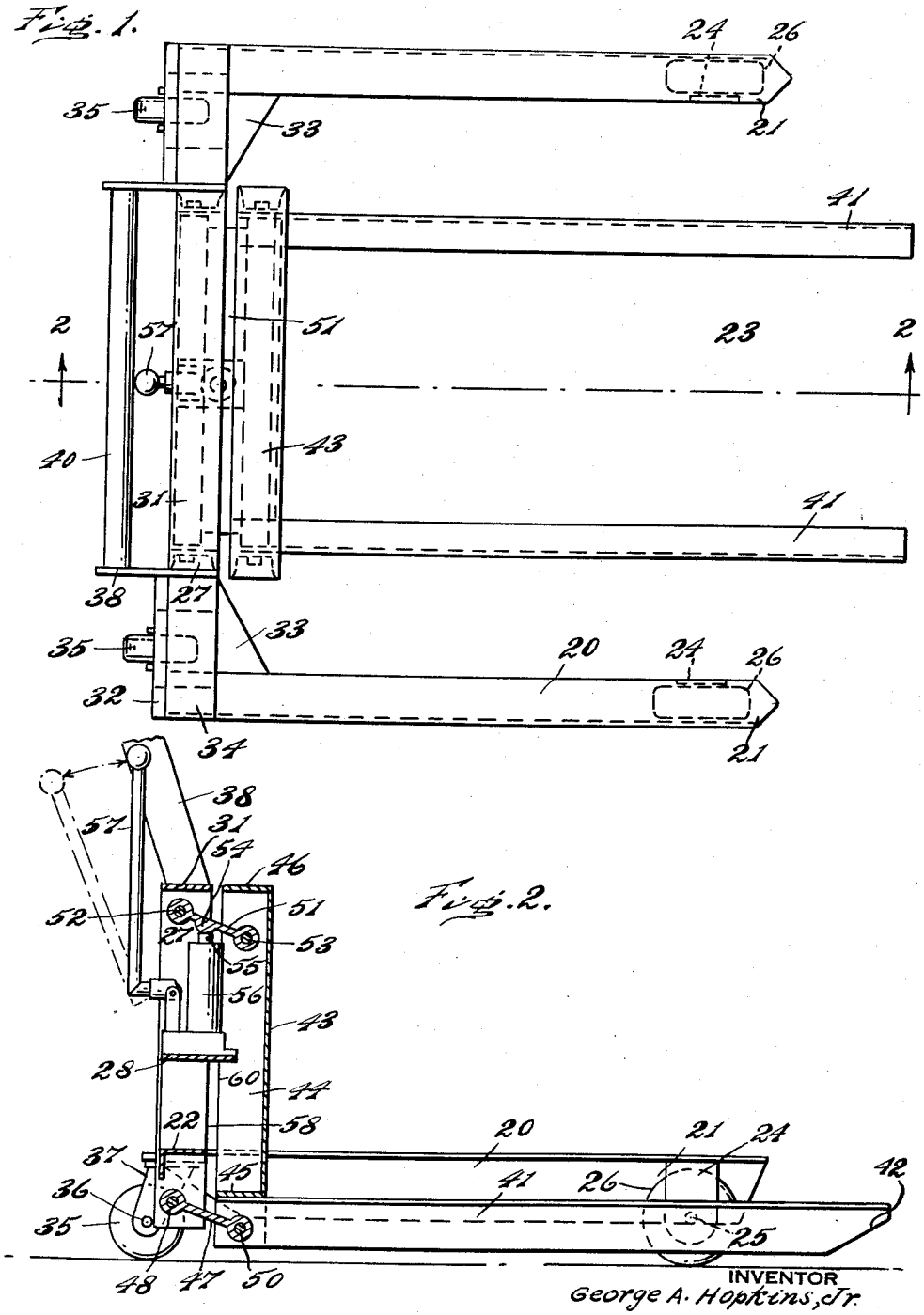
INVENTOR
George A. Hopkins, Jr.
BY
ATTORNEYS

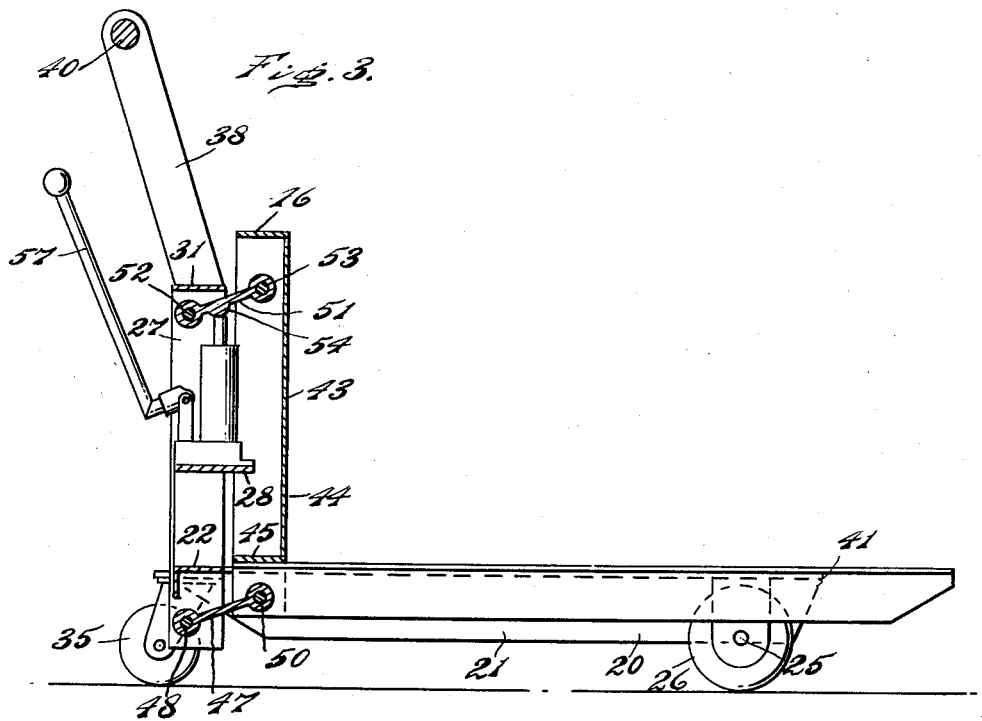
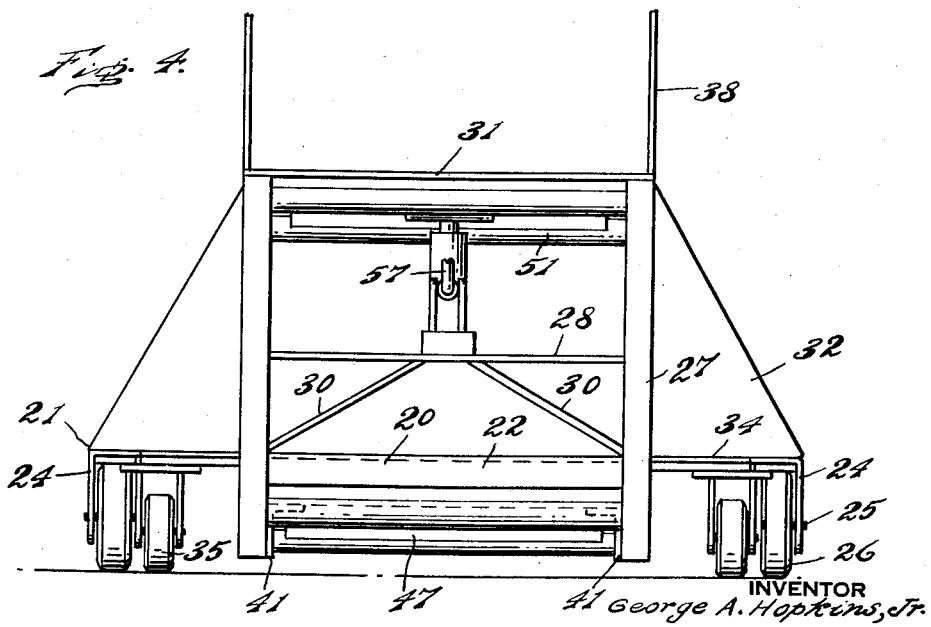

United States Patent Office 2,925,999
Patented Feb. 23, 1960

2,925,999

PALLET JACK

George A. Hopkins, Jr., Havertown, Pa.

Application March 13, 1956, Serial No. 571,176

1 Claim. (Cl. 254—10)

The present invention relates to hand straddle pallet trucks of the character which are most suitable for raising a pallet and the work mounted thereon a few inches above the floor, transporting the pallet and the work to a place where the load is to be discharged from the truck, and then depositing the pallet on the floor, rack or vehicle, and removing the truck.

A purpose of the invention is to permit the use of any standard pallet without elimination of floor boards, to be raised by the hand straddle pallet truck and transported and then unloaded.

A further purpose is to mount the hand straddle pallet truck on wheels carried by outriggers and support the tines of the fork by the outriggers, while manipulating the fork through a parallelogram formed by top and bottom links manipulated by a jack.

A further purposed is to pivot one end of each link on an upright and the other end of each link on a fork support and to limit the motion of the fork in one or both directions by predetermined engagement between the upright and the fork support.

A further purpose is to cause a self-contained jack to act directly on one of the links.

A further purpose is to avoid the raising or lowering of the fork tines with respect to wheels on the tines themselves.

A further purpose is to pivot the lower link directly through the tines of the fork.

A further purpose is to gain increased stability by placing rear wheels at the rear end of the outriggers and front wheels at the opposite corners of the base frame, thus avoiding the possibility that the structure will tilt if one wheel enters a depression in the floor.

A further purpose is to permit the use of larger load wheels on a hand straddle pallet truck so as to reduce the load concentration on the floor.

A further purpose is to enter a pallet with no contact of the tines with the pallet.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 1 is a top plan view of the hand straddle pallet truck of the invention.

Figure 2 is a section on the line 2—2 of Figure 1, showing the fork in the lower position which it might assume when entering or lifting the pallet, and breaking away the handle.

Figure 3 is a view similar to Figure 2 showing the fork raised in position to transport the pallet and the load.

Figure 4 is a front elevation of the device of the invention with the handle broken away.

Describing in illustration but not in limitation and referring to the drawings:

In a wholesale grocery warehouse, each of the order pickers commonly receives invoices enumerating the customers orders and walks around the warehouse with a cart or other vehicle and loads the products ordered. In some cases the order picker off-loads the orders to a delivery truck by handling each individual item. In other cases the order picker may place a pallet on his cart and load the goods on top of the pallet. The pallet is then unloaded by a fork lift truck or the like.

In the usual practice the order picker's cart does not carry a pallet, but moves to the loading area where it waits for a considerable time before the goods are loaded onto the delivery truck.

Since the cart is inactive a large part of the time, it is necessary to have several carts for each order picker. Of course it would be impractical to provide fork lift trucks for each order picker in most cases, as the investment would be too great.

Material handling trucks of the general type of the present invention are employed in factories and warehouses to pick up loads carried on skids or pallets, raise them to clear the floor, and transport them to other locations. The devices lift the skid or pallet by means of fork tines or a platform into which are incorporated load bearing wheels which are depressed in some manner to raise the pallet or skid off the floor for movement.

In existing designs, small load-carrying rear load wheels are employed which are limited to a size (the standard is about 3¼") to enable them to enter between the top and bottom deck boards of a conventional double faced pallet. These load wheels are incorporated in the lifting forks or platform and are lifted by a mechanical linkage which extends through the length of the lifting tines to the front of the truck where the lifting impetus can be applied by hydraulic or mechanical means. In most present trucks the front wheels raise a smaller vertical distance to accomplish the lifting of the pallet or skid off the floor. These front wheels are located in the center of the front of the truck, and usually comprise two wheels close together which, with the rear wheels give the effect of a three-point suspension. The front wheels are usually connected to the steering and towing handle and turn with it.

It will be apparent that the prior art trucks described which incorporate small load wheels for the pallet entry are difficult to move under load because of the small size of the load wheels, making them abusive to floors because of load concentration. Furthermore such prior art trucks are difficult to introduce into a conventional double faced pallet because they must travel up and over the bottom boards to get into a lifting position but to do this they need assistance in the form of separate booster roller wheels or shoes at the front and back of the load wheels. It is furthermore necessary to especially design the bottom deck boards of a conventional double faced pallet to allow the load wheels to engage the floor during the lifting cycle.

The present invention eliminates the necessity of having load carrying wheels in the pallet between the upper and lower deck boards. This function is accomplished by load arms which straddle the pallet. Accordingly, the restriction of the small load wheel size encountered in the prior art is eliminated by the present invention. The invention also avoids the need for all linkages to the load wheels by changing the load wheels which have previously been lifted. By using large load wheels, the problem of abrasion on the floor is avoided.

The invention simplifies the construction of a truck, for the purposes above specified, greatly reducing the number of parts by eliminating the wheel lifting mechanism which is both complicated and burdensome to the hydraulic system and at the same time imparting improved stability, smoother and easier entrance and exits in the pallet, and much greater latitude in selection of uses to which the equipment can be applied.

In the present invention the lifting is accomplished by reason of cantilevered lifting forms located between the straddle arms. The lifting fork tines can be inserted into a pallet or removed without touching either the top or bottom deck boards.

By the design of the invention it is not necessary to lift the load wheels, and therefore wheels are placed at four (4) corners, greatly increasing the stability and improving the maneuvering ability of the truck.

The invention employs a parallelogram linkage through which the tines of the fork are raised and lowered by a simple contained jack acting directly on one of the links. This has the advantage that the vertical members of the linkage can service to limited motion in both directions.

Due to fact that the parallelogram linkage undergoes relatively slight movement in raising and lowering, it is not necessary to use a special hydraulic mechanism, but an inexpensive self contained hydraulic jack would adequately function.

One of the advantages of the invention is that the novel truck can be employed as a controlled vehicle or a unit of a train of controlled vehicles. The truck also can be manipulated by hand for floor or overhead conveyor systems, or any other desired propelling means.

Considering the structure in detail, I illustrate a bottom or base frame 20 consisting of outriggers 21 united to a forward cross frame 22, and suitably of C formation to surround an open space 23 in which the pallet and the load are placed.

Each of the outriggers at its rear or outer end carries a downwardly directed yoke 24 which supports a shaft 25 pivoting a wheel 26, the wheel suitably being permanently aligned front to back with respect to the outrigger.

The base frame connects with an upright structure at the front thereof including columns 27 at the sides, which are united to the front portion 22 of the base as by welding, and cross connect part way up by a rib 28 and braces 30 suitably welded to one another and to the columns, and also cross connect at the top by a plate 31. The outriggers are supported and braced from the base frame and upright structure by vertical gussets 32 suitably welded in place and horizontal gussets 33 welded in place. Bracket portions 34 welded in place extend out over the central portion 22 of the base frame to hold the outriggers.

At each of the forward corners of the base frame is mounted a castor wheel 35 which is pivoted at 36 in a yoke 37, the yoke swinging on a vertical axis not shown, as well known in castors, so as to allow the device to be steered.

Extending above the upright structure at either side of the front is a handle bracket 38 which receives and holds a transversely extending towing handle 40 at the front.

Located in the space between the outriggers are rearwardly extending tines 41 of a fork, the tines being suitably pointed at their rearward ends 42 to ease insertion into the pallet. The tines as shown are angles with one flange of each directed toward the other and positioned in spaced relation to conform with the standard pallet width.

A fork supporting structure 43 extends vertically at the forward end of the tines desirably including vertical elements 44, a bottom plate 45 which rests directly above the tines and prevents them from tilting and a top plate 26. The structure 43 is suitably welded together.

A link 47 extends transversely suitably clear across the forward end of the base from one tine to the other and is pivoted to the base frame at the lower ends of the uprights by a pivot pin 48. The opposite end of the link 47 is pivoted by a pin 50 which extends directly through the forward ends of the tines, thus assuring simple and firm connection of the link to the fork.

At the top a link 51 of exactly equal length extending from one tine to the other is pivoted by a pin 52 to the upright structure immediately above the pivot pin 48 and transversely of the outriggers. The opposite end of the link 51 is pivoted by a pin 53 to the fork supporting structure 43.

A parallelogram is produced by the two links, since the distance from the axis of pivot 48 to the axis of pivot 50 equals the distance from the axis of pivot 52 to the axis of pivot 53. Also the distance from the axis of pivot 48 to the axis of pivot 52 equals the distance from the axis of pivot 50 to the axis of pivot 53.

The link 51 preferably is provided with a bulbous jack engaging cam face 54 which engages the ram 55 of a self-contained hydraulic or other suitable jack 56 which is fastened to rib 28 and is operated suitably by a jack handle 57, as well known.

It will be evident that in either extreme limiting position of the links the surface 58 of the upright structure will engage the surface 60 of the fork support and provide a stop, since the two structures are in abutting relation.

In operation the hand straddle pallet truck is manipulated until the fork is in line with the pallet, and then with the tines at the level shown in Figure 2 is inserted in the pallet, the outriggers being on opposite sides of the pallets. The used then by manipulating the jack handle 57 raises the ram which acts on the cam face 54 and shifts the links to the position of Figure 3, raising the pallet by the action of the tines of the fork. The user then is free to carry the pallet by pulling on the handle 40 and manipulating the handle 40 laterally to steer. In this way the operator can use the pallet truck as a cart and pick up a load on the pallet.

When the operator desires to lower the pallet he can simply shift the position of the jack handle 57 and manipulate the jack to lower the linkage (operating a jack reversing lever if required by the particular jack, as well known), until he brings the fork to the position of Figure 2. The pallet truck can then be pulled out and used to pick up another pallet.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claim.

Having thus described my invention, what I claim as new and desire to secure by Letters Patent is:

A hand straddle pallet truck, comprising a C-shaped base frame including outriggers at the sides of the frame, the spacing between the outriggers being sufficient to permit the outriggers to extend one on one side and the other on the other side of a pallet, wheels on the front and rear of the base frame, there being a pallet manipulating free space between the outriggers unimpeded by wheels, an upright structure on the front of the base frame, links pivoted on axes transverse to the outriggers, one of the links being a lower link pivoted on the base frame near the bottom and the other of the links being an upper link pivoted on the upright structure above the base frame, the upper link having a cam face, the links being of substantially equal length, a vertically extending movable fork support positioned rearwardly of the upright structure, pallet lifting fork tines extending rearwardly of the fork support in the space between the outriggers, there being a pivotal connection between the fork support and the upper link at its end remote from the upright structure, there being a pivotal connection between the fork support and the lower link at the end remote from the pivotal mounting of the lower link on the base frame, the respective pivots of the links forming a parallelogram, and a jack mounted on the upright structure and operatively acting on the cam face of the upper link.

References Cited in the file of this patent

UNITED STATES PATENTS

| | | |
|---|---|---|
| 2,358,957 | Barrett | Sept. 26, 1944 |
| 2,550,548 | Framhein | Apr. 24, 1951 |
| 2,616,580 | Olson | Nov. 4, 1952 |